US009513660B2

(12) United States Patent
Farmer et al.

(10) Patent No.: US 9,513,660 B2
(45) Date of Patent: *Dec. 6, 2016

(54) CALIBRATED TIMEOUT INTERVAL ON A CONFIGURATION VALUE, SHARED TIMER VALUE, AND SHARED CALIBRATION FACTOR

(71) Applicant: International Business Machines Corporation, Armonk, NY (US)

(72) Inventors: James V. Farmer, Wappingers Falls, NY (US); Daniel S. Gritter, Wappingers Falls, NY (US); Glenn I. Katzen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,770

(22) Filed: Feb. 5, 2016

(65) Prior Publication Data

US 2016/0154680 A1 Jun. 2, 2016

Related U.S. Application Data

(63) Continuation of application No. 13/973,294, filed on Aug. 22, 2013, now Pat. No. 9,304,536.

(51) Int. Cl.
*G06F 9/46* (2006.01)
*G06F 1/14* (2006.01)
*G06F 9/50* (2006.01)

(52) U.S. Cl.
CPC ............... *G06F 1/14* (2013.01); *G06F 9/5038* (2013.01)

(58) Field of Classification Search
None
See application file for complete search history.

(56) References Cited

U.S. PATENT DOCUMENTS 5,894,583 A * 4/1999 Johnson .............. G06F 11/0757
710/260
6,760,802 B2 7/2004 Jahnke et al.
(Continued)

FOREIGN PATENT DOCUMENTS

EP 0355243 A1 2/1990

OTHER PUBLICATIONS

VMare, "VMware vSphere vMotion Architecture, Performance and Best Practices in VMware vSphere 5," VMware Corporation, Technical White Paper, Performance Study, www.vmware.com/whitepaper, Sep. 2011, 26 pgs.
(Continued)

*Primary Examiner* — Wissam Rashid
(74) *Attorney, Agent, or Firm* — Erik K. Johnson (57) ABSTRACT

A processor-implemented method for implementing a shared counter architecture is provided. The method may include receiving, by a worker thread, an application request; recording, by a common timer thread, a shared timer value and acquiring, by the worker thread, the shared timer value. The method may further include recording, by the common timer thread, a shared calibration factor; acquiring, by the worker thread, a configuration value corresponding to the application request and generating, by the worker thread, a calibrated timeout interval for the application request based on the shared calibration factor, the shared timer value, and the configuration value. The method may further include registering, by the worker thread, the calibrated timeout interval for the application request on a current timeout list; determining, by the common timer thread, a timeout occurrence for the application request based on the registered calibrated timeout interval; and releasing resources based on the timeout occurrence.

15 Claims, 3 Drawing Sheets

(56) References Cited

U.S. PATENT DOCUMENTS

2012/0002546 A1  1/2012 Sundararaman et al.
2015/0058866 A1  2/2015 Farmer et al.

OTHER PUBLICATIONS

Anonymous, "Methods for Optimizing Retransmission Timers," An IP.com Prior ART Database Technical Disclosure, http://ip.com/IPCOM/000208822, Jul. 19, 2011, 7 pgs.

Rinard, M., "Analysis of Multithreaded Programs," Massachusetts Institute of Technology, P. Cousot (Ed.): SAS 2001, LNCS 2126, pp. 1-19, 2001, © Springer-Verlag Berlin Heidelberg 2001.

Farmer et al., "Calibrated Timeout Interval on a Configuration Value, Shared Timer Value, and Shared Calibration Factor," U.S. Appl. No. 15/016,830, filed Feb. 5, 2016.

\* cited by examiner

CALIBRATED TIMEOUT INTERVAL ON A CONFIGURATION VALUE, SHARED TIMER VALUE, AND SHARED CALIBRATION FACTOR

FIELD OF THE INVENTION

The present invention relates generally to the field of databases and more particularly to the monitoring of a set of database connections for inactivity in a multithreaded environment.

BACKGROUND

Currently, the monitoring of a set of database connections for inactivity in a multi-threaded environment is done by submitting multiple get clock requests (i.e., time requests). These multiple get clock requests result in additional processing overhead since processing resources are consumed by each request. As a result, the processing overhead may be measurable when the multiple get clock requests are used in a high performance environment and therefore, may negatively impact performance.

Conversely, when switching to a shared counter architecture, the overhead of getting clock counters may be reduced since only a single thread is needed to obtain the current clock time. However, as the system approaches higher utilization, the accuracy of the result degrades which may result in early timeout of operations.

SUMMARY

A processor-implemented method for implementing a shared counter architecture is provided. The method may include receiving, by a worker thread, an application request; recording, by a common timer thread, a shared timer value and acquiring, by the worker thread, the shared timer value. The method may further include recording, by the common timer thread, a shared calibration factor; acquiring, by the worker thread, a configuration value corresponding to the application request and generating, by the worker thread, a calibrated timeout interval for the application request based on the shared calibration factor, the shared timer value, and the configuration value. The method may further include registering, by the worker thread, the calibrated timeout interval for the application request on a current timeout list; determining, by the common timer thread, a timeout occurrence for the application request based on the registered calibrated timeout interval; and releasing resources based on the timeout occurrence.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field databases and more particularly to the monitoring of a set of database connections for inactivity in a multi-threaded environment. The following described exemplary embodiments provide a system, method and program product for implementing a shared counter architecture in combination with a calibrated timeout interval.

A thread of execution is the smallest sequence of programmed instructions that may be managed independently by an operating system scheduler. A thread is contained inside a process. Multiple threads can exist within the same process and share resources such as memory. On a single processor, multithreading generally occurs by the processor switching between different threads (i.e., multitasking). On a multiprocessor or multi-core system, threads may be concurrent, with every processor or core executing a separate thread simultaneously.

As previously described, the monitoring of a set of database connections for inactivity in a multi-threaded environment is currently done by submitting multiple get clock requests (i.e., time requests). These multiple get clock requests result in additional processing overhead since processing resources are consumed by each request. As a result, the processing overhead may be measurable when the multiple get clock requests are used in a high performance environment and therefore, may negatively impact performance.

One current method being utilized today is to switch to a shared counter architecture which may reduce overhead of getting clock counters since only a single thread is needed to obtain the current clock time. However, when the system approaches higher utilization, the accuracy of the result degrades which may result in early timeout of operations. Therefore, there exists a need for providing a shared counter architecture in combination with a calibrated timeout offset.

According to at least one embodiment of the present invention, a shared counter architecture may be implemented in combination with a calibrated timeout offset and as such, the performance gain of the shared counter architecture may be realized without sacrificing accuracy of the individual counter architecture.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product for implementing a shared counter architecture in combination with a calibrated timeout offset. Additionally, embodiments of the present invention may ensure the performance gain of the shared counter architecture is realized without sacrificing accuracy of the individual counter architecture.

According to at least one embodiment of the present invention, a shared counter architecture for combining clock access across multiple transactions is implemented. Embodiments of the present invention may act as a row manager (i.e., a middleware) between an application program and a database, such as DB2. When monitoring a set of database connections for inactivity in a multithreaded environment, the amount of time spent retrieving the current time for message timeout processing may become a measurable portion of the execution time. Therefore, to reduce the time spent retrieving the current time, a shared timer value may be created for all request threads to retrieve the time value from, while a single thread (i.e., a common timer thread) may update the shared timer value to match the current time.

Additionally, the single thread (i.e., the common timer thread) may also operate to detect whether a timeout has occurred. The common timer thread may be scheduled at regular intervals in order to check the current state. However, depending on the load of the system, the common timer thread may not be dispatched at regular intervals. As the load increases, the dispatch time may increase, resulting in a loss of accuracy for the saved current time. As such, to counteract this decrease in accuracy, the interval between dispatches of the common timer thread may be additionally stored as a calibrated offset (i.e., a shared calibration factor) to the timeout value that may be set by a system administrator or database administrator (i.e., the configuration value). The configuration value, along with the shared timer value and the shared calibration factor may be used to determine a calibrated timeout interval which may be registered on a current timeout list.

Figure 1:
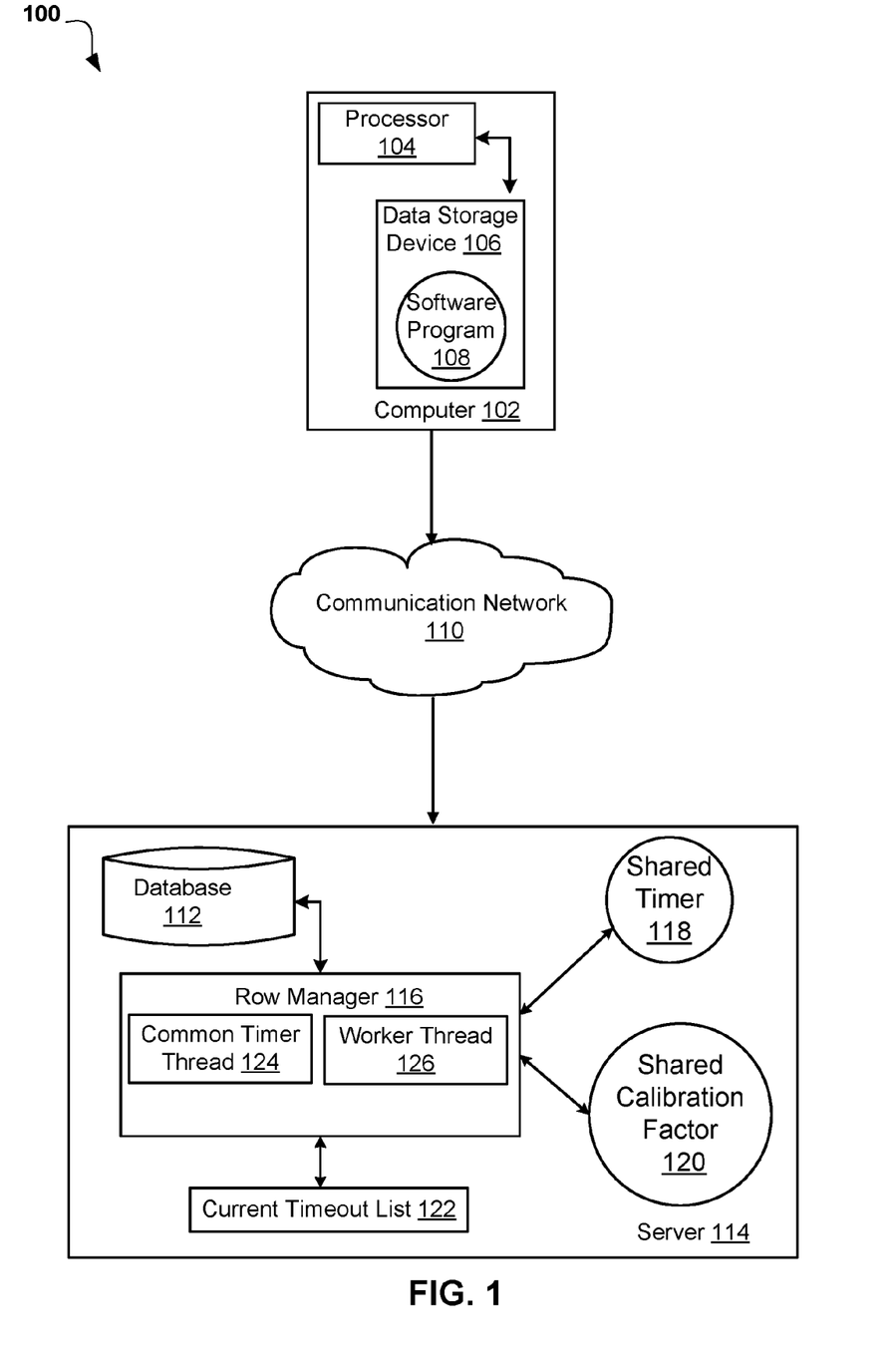
FIG. 1 illustrates the hardware that may be used in a networked computer environment with an exemplary row manager to implement a shared counter architecture in combination with a calibrated timeout interval according to one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a server 114 that is enabled to run a core service developer 114 that interacts with a database 112, and a communication network 110. The networked computer environment 100 may include a plurality of computers 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with database 112 running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database.

As previously described, the client computer 102 may access database 112, running on server computer 114 via the communications network 110. For example, a user using an application program 108 running on a client computer 102 may connect via a communication network 110 to database 112 which may be running on server 114. Additionally, the row manager 116 may manage a common timer thread 124 and a worker thread 126. The row manager 116 running on server 114 may provide a shared counter architecture for combining clock access across multiple transactions and may act as a middleware between an application program 108 and a database 112 to reduce the amount of time spent retrieving the current time for message timeout processing.

As such, a shared timer value 118 may be created for all request threads (i.e., worker thread 126) to retrieve the current time value from, while a single thread (i.e., common timer thread 124) may update the shared timer value 118 to match the current time. The worker thread 126 may retrieve the shared timer value 118 and apply the shared timer value to a shared calibration factor 120 and then the worker thread may apply the registered (i.e., current) timeout interval retrieved from the current timeout list 122 to determine a calibrated timeout factor. The calibrated timeout interval may then be registered on the current timeout list 122.

The row manager process is explained in more detail below with respect to FIG. 2.

Figure 2:
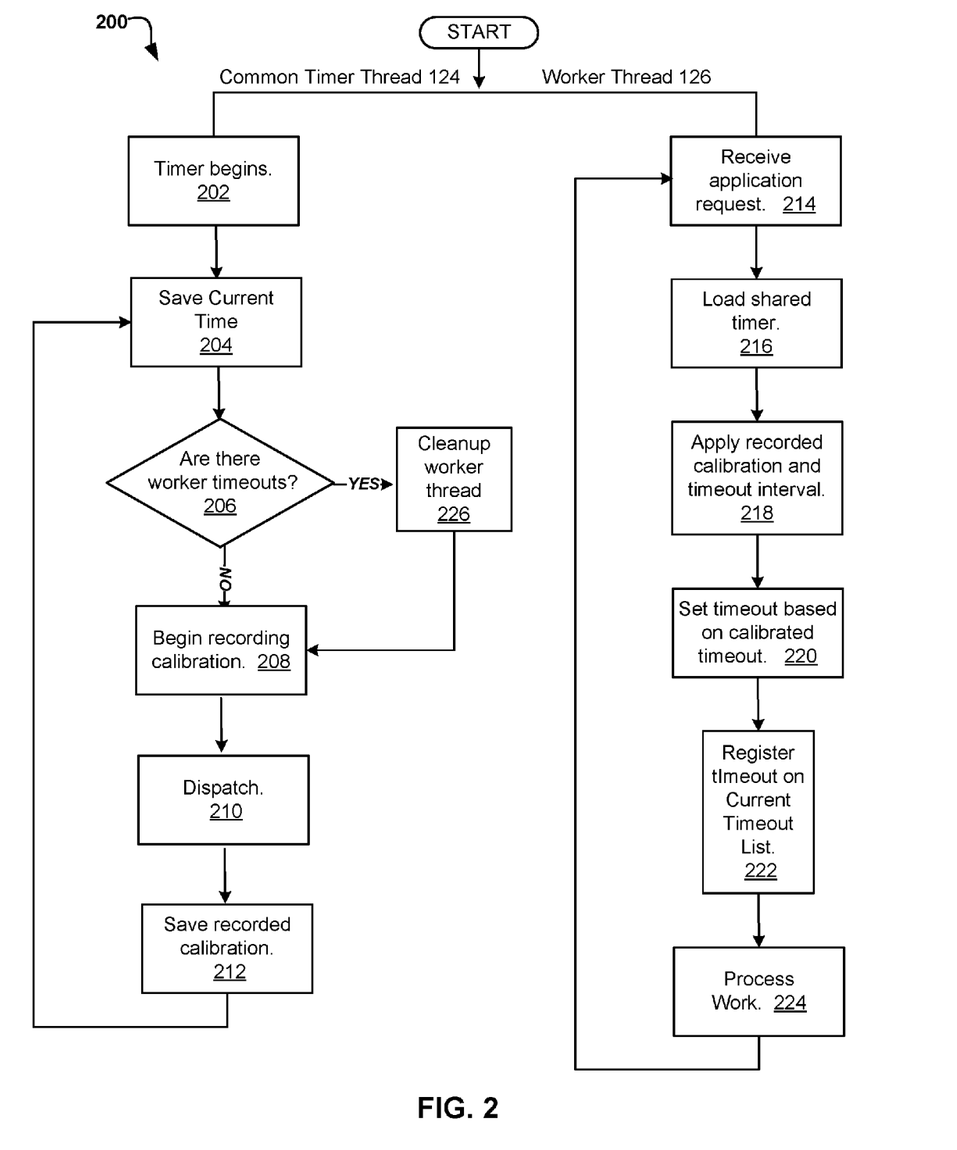
FIG. 2 is an operational flowchart illustrating the steps carried out by a row manager to implement a shared counter architecture in combination with a calibrated timeout interval according to one embodiment.

Referring now to FIG. 2, an operational flowchart illustrating the steps carried out by a row manager to implement a shared counter architecture in combination with a calibrated timeout offset according to one embodiment is depicted. As previously stated, the method may be implemented by providing a shared counter architecture for combining clock access across multiple transactions. Embodiments of the present invention may act as a middleware between an application program and a database.

According to one implementation of the present embodiment, the row manager 116 (FIG. 1) comprises of two threads running concurrently (i.e., the common timer thread 124 (FIG. 1) and the worker thread 126 (FIG. 1)). For purposes of this example, the common timer thread 124 (FIG. 1) may begin processing, with a starting time (i.e., shared timer value 118 (FIG. 1)) of "1" and with a shared calibration factor 120 (FIG. 1) being set to "0".

At 202, the common timer thread 124 (FIG. 1) begins processing the next interval and at 204, the common timer thread 124 (FIG. 1) saves the current time 118 (FIG. 1) which in this example, is "2". The shared calibration factor 120 (FIG. 1) will be updated to "1" which is the difference in time between the shared timer value (i.e., the current time of "2") and the interval time of the last dispatch (i.e., "1" in this example) of the common timer thread 124 (FIG. 1) (i.e., 2−1=1). Therefore, the shared calibration factor 120 (FIG. 1) would be "1".

As previously stated, at least one worker thread 126 (FIG. 1), may be operating concurrently with the common timer thread 124 (FIG. 1). As such, at 214, the worker thread 126 (FIG. 1) may receive an application request from an application (i.e., Application A) and then at 216 the worker thread 126 (FIG. 1) may load the shared timer value 118 (FIG. 1). At 218, the worker thread 124 (FIG. 1) may determine the sum of the shared timer value 118 (FIG. 1) and the shared calibration factor 120 (FIG. 1) and apply a configuration value for Application A at 220. With respect to the above example, the common timer thread 124 (FIG. 1) may begin processing with a current time 118 (FIG. 1) of "2" and the worker thread 126 (FIG. 1) may load the shared calibration factor 120 (FIG. 1) with the previously determined value set to "1". Then, at 218, the worker thread 126 (FIG. 1) may add the configuration value timeout interval of "9" (in this example) to the shared timer value 118 (FIG. 1) of "2" and the shared calibration factor 120 (FIG. 1) of "1". Then the worker thread 126 (FIG. 1) may determine the calibrated timeout interval (i.e., current timeout) for Application A is "12" (i.e., ("2"+"1"+"9")="12").

Next, at 222 the worker thread 126 (FIG. 1) would register the calibrated timeout interval of "12" for that particular application (i.e., Application A) on the current timeout list 122 (FIG. 1). Then, at 224, the worker thread 126 (FIG. 1) processes the work requested by the Application A and returns the result to the Application A.

Simultaneously, at 206, the common timer thread 124 (FIG. 1) may check for any timeouts that have been registered by the worker thread 126 (FIG. 1). For example, the common timer thread 124 (FIG. 1) may check the current timeout list 122 (FIG. 1) that was generated by the worker thread 126 (FIG. 1) to determine if the shared timer value 118 (FIG. 1) matches the calibrated timeout interval on the current timeout list 122 (FIG. 1) for Application A. If the common timer thread 124 (FIG. 1) determines the current time (i.e., the shared timer value) matches the calibrated timeout interval on the current timeout list 122 (FIG. 1), then the worker thread 126 (FIG. 1) may perform a clean up of resources at 226. In other words, any resources that are tied up as a result of the application timeouts on the worker thread 126 (FIG. 1) are released.

If at 206, the common timer thread 124 (FIG. 1) determines there is not a timeout (i.e., the shared timer value does not match the calibrated timeout interval on the current timeout list 122 (FIG. 1)) or once the resources are released at 226, then at 208, the common timer thread 124 (FIG. 1) may begin recording the shared calibration factor and queue for the next dispatch. The queue for the next dispatch would be the time that the common timer thread 124 (FIG. 1) expects to get more work based on the shared calibration factor 120 (FIG. 1). With respect to the previous example, the initial shared calibration factor 120 (FIG. 1) was set to "0", therefore, the common timer thread 124 (FIG. 1) would automatically process the next interval (i.e., dispatch at 210). Then at 212, the common timer thread 124 (FIG. 1) would save and record a shared calibration factor 120 (FIG. 1) of "1". The shared calibration factor 120 (FIG. 1) is the difference between the current clock time (i.e., shared timer value 118 (FIG. 1)) of "2" and the clock time of the last dispatch interval of the common timer thread 124 (FIG. 1), which would be "1" in this example (i.e., "2"–"1"="1").

Continuing with this example, the common timer thread 124 (FIG. 1) would then process the next interval at 202. Next at 204, the common timer thread 124 (FIG. 1) would load the current clock time 118 (FIG. 1), which may be "4". This would set the calibration factor 120 (FIG. 1) to be "2" since the last dispatch interval of the common timer thread 124 (FIG. 1) occurred at "2" (the difference in time between the current time and the last dispatch interval of the common timer thread 124 (FIG. 1)) (i.e., "4"–"2"="2").

Then at 206, the common timer thread 124 (FIG. 1) may check the calibrated timeout interval for the Application A, which was previously determined in the above example to be "12". Since the current time is "4" (and is not equal to "12") a timeout would not have occurred.

Concurrently, if a new request comes in from another application (i.e., Application B), the worker thread 126 (FIG. 1) may process the new request at 214. Then at 216, the worker thread 126 (FIG. 1) may load the shared timer value 118 (FIG. 1) with the current time of "4" and at 218, the worker thread 126 (FIG. 1) may add the calibration factor 120 (FIG. 1) of "2" to the configuration value of "9". Therefore, the calibrated timeout interval for Application B would be "15" (i.e., (4+2+9)=15. Then, at 222, the worker thread 126 (FIG. 1) may register the calibrated timeout interval on the current timeout list 122 (FIG. 1). Next, the worker thread 126 (FIG. 1) would finish processing the work for Application B at 224.

Continuing with the same example, the common timer thread 124 (FIG. 1) may process the next interval and at 204, may load the current clock time, which now may be "5". It then may check the calibrated timeout interval on the current timeout list 122 (FIG. 1) for "Application B" at 206, which was previously determined to be "15". Since the current time is "5" and does match the calibrated timeout interval of "15", a timeout has not occurred.

Next, at 208, the common timer thread 124 (FIG. 1) may set the calibration factor to be "1" since the last dispatch of the common timer thread 124 (FIG. 1) occurred at "4" and the shared timer value 118 (FIG. 1) is now "5" (i.e., 5–4=1). Then the common timer thread 124 (FIG. 1) would automatically process the next interval (i.e., dispatch at 210) and at 212, the common timer thread 124 (FIG. 1) would save and record the calibration factor of "1". As previously described, the calibration time is the difference between the current clock time (i.e., shared timer value 118 (FIG. 1)) of "5" and the clock time of the last iteration of "4" (i.e., "5"–"4"="1").

Continuing again with the same example, the common timer thread 124 (FIG. 1) may process the next interval and at 204, may load the shared timer value 118 (FIG. 1) with the current clock time, which now may be "6". It then checks the current timeout list 122 (FIG. 1) for the calibrated timeout interval of "Application B" at 206, which was previously registered as "15". Since the shared timer value 118 (FIG. 1) is "6" and does not match the calibrated timeout interval for "Application B", a timeout has not occurred.

Next, at 208, the common timer thread 124 (FIG. 1) may set the calibration factor to be "1" since the last iteration of the common timer thread 124 (FIG. 1) occurred at "5" (i.e., 6–5=1). Then the common timer thread 124 (FIG. 1) may automatically process the next interval (i.e., dispatch at 210) and at 212, the common timer thread 124 (FIG. 1) may save and record a calibrated timeout interval of "1". As previously described, the calibration time is the difference between the current clock time (i.e., shared timer value 118 (FIG. 1)) of "6" and the clock time of the last dispatch interval of the common timer thread 124 (FIG. 1) of "5" (i.e., "6"–"5"="1").

For example purposes only, iterations 6-14 of the common timer thread 124 (FIG. 1) will be skipped. Continuing with the same example, the next time interval may be 15. At 204, the common timer thread 124 (FIG. 1) may set the calibration factor to be "1" since the last dispatch interval of the common timer thread 124 (FIG. 1) occurred at "14" (i.e., "15"–"14"="1"). Then, at 206, the common timer thread 124 (FIG. 1) may check the timeout value for Application B on the current timeout list 122 (FIG. 1), which is set at 15. Since the shared timer value of "15" is equal to the calibrated timeout interval of "15", a timeout has occurred, and therefore, the resources held for "Application B" may be released at 226 and the process would continue as explained above.

Figure 3:
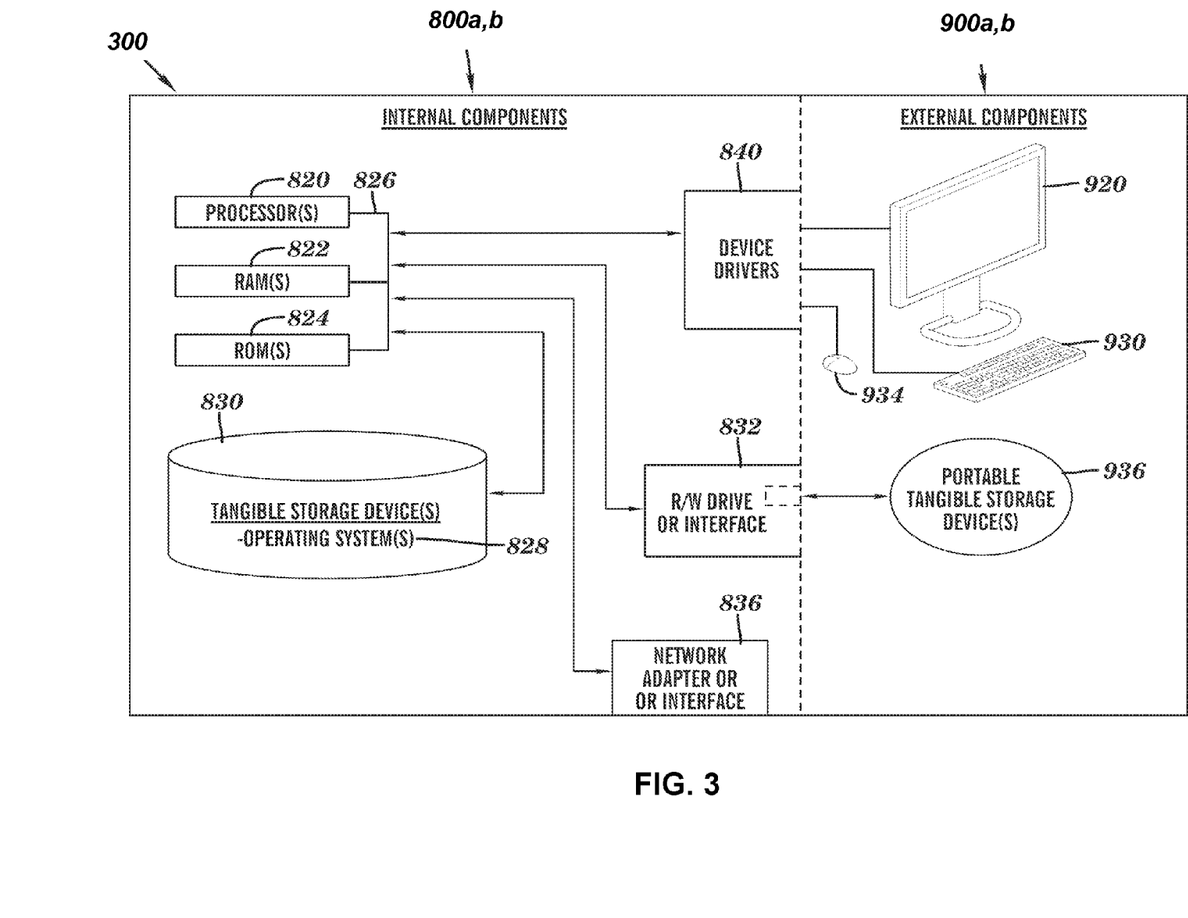
FIG. 3 is a block diagram of internal and external components of computers and servers depicted in FIG. 1.

FIG. 3 is a block diagram of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server computer 114 (FIG. 1) include respective sets of internal components 800 a, b and external components 900 a, b illustrated in FIG. 3. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108 can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless wi-fi interface cards, or 3G or 4G wireless interface cards or other wired or wireless communication links. A software program 108 in client computer 102 can be downloaded to client computer 102 from an external computer via a network (for example, the Internet, a local area network or other, wide area network) and respective network adapters or interfaces 836. From the network adapters or interfaces 836, the software program 108 in client computer 102 is loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for implementing a shared counter architecture, the method comprising:
   receiving, by a worker thread, an application request;
   recording, by a common timer thread, a shared timer value;
   acquiring, by the worker thread, the shared timer value;
   recording, by the common timer thread, a shared calibration factor, wherein the shared calibration factor comprises the difference between a current clock time and an interval time the common timer thread was last dispatched;
   acquiring, by the worker thread, a configuration value corresponding to the application request;
   generating, by the worker thread, a calibrated timeout interval for the application request based on the shared calibration factor, the shared timer value, and the configuration value;
   registering, by the worker thread, the calibrated timeout interval for the application request on a current timeout list;
   determining, by the common timer thread, a timeout occurrence for the application request based on the registered calibrated timeout interval; and
   releasing, by the common timer thread, resources based on the timeout occurrence.

2. The method of claim 1, wherein the common timer thread and the worker thread execute concurrently.

3. The method of claim 1, wherein the shared timer value comprises a current clock time.

4. The method of claim 1, wherein the common timer thread dispatches at an interval time.

5. The method of claim 1, wherein the determined timeout occurrence comprises determining when a current clock time is equal to the calibrated timeout interval located within the current timeout list.

6. A computer system for implementing a shared counter architecture, the computer system comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
receiving, by a worker thread, an application request;
recording, by a common timer thread, a shared timer value;
acquiring, by the worker thread, the shared timer value;
recording, by the common timer thread, a shared calibration factor, wherein the shared calibration factor comprises the difference between a current clock time and an interval time the common timer thread was last dispatched;
acquiring, by the worker thread, a configuration value corresponding to the application request;
generating, by the worker thread, a calibrated timeout interval for the application request based on the shared calibration factor, the shared timer value, and the configuration value.
registering, by the worker thread, the calibrated timeout interval for the application request on a current timeout list;
determining, by the common timer thread, a timeout occurrence for the application request based on the registered calibrated timeout interval; and
releasing, by the common timer thread, resources based on the timeout occurrence.

7. The computer system of claim 6, wherein the common timer thread and the worker thread execute concurrently.

8. The computer system of claim 6, wherein the shared timer value comprises a current clock time.

9. The computer system of claim 6, wherein the common timer thread dispatches at an interval time.

10. The computer system of claim 6, wherein the determined timeout comprises determining when a current clock time is equal to the calibrated timeout interval located within the current timeout list.

11. A computer program product for implementing a shared counter architecture, the computer program product comprising:
one or more non-transitory computer-readable storage devices and program instructions stored on at least one of the one or more non-transitory computer-readable storage devices, the program instructions executable by a processor, the program instructions comprising:
program instructions to receive, by a worker thread, an application request;
program instructions to record, by a common timer thread, a shared timer value;
program instructions to acquire, by the worker thread, the shared timer value;
program instructions to record, by the common timer thread, a shared calibration factor, wherein the shared calibration factor comprises the difference between a current clock time and an interval time the common timer thread was last dispatched;
program instructions to acquire, by the worker thread, a configuration value corresponding to the application request;
program instructions to generate, by the worker thread, a calibrated timeout interval for the application request based on the shared calibration factor, the shared timer value, and the configuration value.
program instructions to register, by the worker thread, the calibrated timeout interval for the application request on a current timeout list;
program instructions to determine, by the common timer thread, a timeout occurrence for the application request based on the registered calibrated timeout interval; and
program instructions to release, by the common timer thread, resources based on the timeout occurrence.

12. The computer program product of claim 11, wherein the common timer thread and the worker thread execute concurrently.

13. The computer program product of claim 11, wherein the shared timer value comprises a current clock time.

14. The computer program product of claim 11, wherein the common timer thread dispatches at an interval time.

15. The computer program product of claim 11, wherein the determined timeout comprises determining when a current clock time is equal to the calibrated timeout interval located within the current timeout list.

* * * * *